United States Patent [19]

Bengtsson

[11] Patent Number: 4,984,831
[45] Date of Patent: Jan. 15, 1991

[54] PIPE SOCKET AND A METHOD OF FORMING A PIPE SOCKET

[75] Inventor: Christer Bengtsson, Värnamo, Sweden

[73] Assignee: Forsheda AB, Forsheda, Sweden

[21] Appl. No.: 259,126

[22] Filed: Oct. 18, 1988

[30] Foreign Application Priority Data

Oct. 29, 1987 [SE] Sweden .................................. 8704231

[51] Int. Cl.$^5$ ............................................. F16L 17/00
[52] U.S. Cl. ..................................... 285/379; 285/110; 285/345; 277/99; 277/207 A
[58] Field of Search ............... 285/379, 110, 345, 374; 277/192, 199, 207 A

[56] References Cited

U.S. PATENT DOCUMENTS

| | | | |
|---|---|---|---|
| 2,434,107 | 1/1948 | Folsom | 285/110 X |
| 2,797,474 | 7/1957 | Main, Jr. | 285/110 X |
| 3,171,675 | 3/1965 | Calciano, Jr. | 285/110 |
| 3,474,834 | 10/1969 | Carey | 285/110 X |
| 3,791,678 | 2/1974 | De Putter | 285/379 X |
| 3,857,589 | 12/1974 | Oostenbrink | 285/379 X |
| 3,938,834 | 2/1976 | Oostenbrink | 285/345 X |
| 4,313,627 | 2/1982 | de Lange | 285/345 X |
| 4,341,392 | 7/1982 | Van Dongeren | 277/207 A |
| 4,342,464 | 8/1982 | Wolf et al. | 285/345 X |
| 4,432,395 | 2/1984 | Beune et al. | 285/345 X |

*Primary Examiner*—Randolph A. Reese
*Assistant Examiner*—Carol I. Bordas
*Attorney, Agent, or Firm*—Jeffers, Hoffman & Niewyk

[57] ABSTRACT

A pipe socket comprising a sleeve (2), an end portion (8) of a pipe (10) of thermoplastic material, an outer sealing ring (4) and an inner sealing ring (6). The sleeve (2) constitutes the inner surface of the pipe socket, and the end portion (8) of the pipe is molded around the sleeve. The outer sealing ring (4) is positioned between the inner surface of the pipe end portion and the outer surface of the sleeve for sealing the pipe end portion and the sleeve in relation to each other, and the inner sealing ring (6) is adapted to seal the space between the inner surface of the pipe socket and the outer surface of a spigot end of a connecting pipe introduced into the socket. The outer sealing ring (4) and the inner sealing ring (6) are connected with each other. The invention also relates to a method of manufacturing a pipe socket (FIG. 1).

17 Claims, 4 Drawing Sheets

PIPE SOCKET AND A METHOD OF FORMING A PIPE SOCKET

The present invention relates to a pipe socket and a method of forming a pipe socket at the end portion of a thermoplastic material pipe.

A pipe joint between the end portions of plastic pipes is usually established by introducing a spigot end of one of the pipe end portions into a socket of the other pipe end portion, the sealing between the outer surface of the spigot end and the inner surface of the socket being provided by means of a sealing ring positioned in the annular space between said surfaces. Thereby, it is usual to locate the sealing ring in an inner groove in the socket. In pipes consisting of thermoplastic material, especially polyvinyl chloride, it is common to form the socket necessary for the pipe jointing by radially expanding the pipe wall in the region of the pipe end portion. This is usually conducted by heating the pipe end portion to a plastic condition whereupon the pipe end portion thus being in softened state is radially expanded by means of a mandrel which is introduced into the pipe end portion. It is common practice to provide the pipe end portion in the same step of operation with an inner groove for receiving the sealing ring which is subsequently used for sealing the joint between the socket and the spigot end introduced therein.

According to a method recently developed the so called socketing operation for forming the socket at the pipe end portion and the positioning of the sealing ring in a locked-in position in the socket is conducted in one single step by positioning the sealing ring on the mandrel before the mandrel is introduced into the softened pipe end portion, whereupon the softened pipe end portion is moved along the outer surface of the mandrel as well as the sealing ring positioned thereon, the sealing ring being retained in the socket after the pipe end portion has been cooled and solidified and the mandrel has been withdrawn from the socket. Thus, the ring constitutes a mould element during the socketing operation and constitutes a sealing ring during a subsequent jointing operation.

In connection with certain thermoplastic materials the method of forming a pipe socket described above can not be used because of the fact that these plastic materials have insufficient shape permanence. Thus, in manufacturing sockets in polyethylehe pipes it has been necessary to manufacture separate sockets by means of injection moulding and to connect the sockets with the end portions of the polyethylene pipes by means of welding or other connection methods.

The object of the invention is to provide a pipe socket and a method of forming such a pipe socket which can be used also in connection with pipes having inferior shape permanence and dimensional stability in connection with heating.

In order to comply with this object the pipe socket according to the invention comprises a sleeve defining the inner surface of the socket, an end portion of a thermoplastic material pipe moulded around the sleeve, an outer sealing ring positioned between the inner surface of the pipe end portion and the outer surface of the sleeve for sealing the pipe end portion and the sleeve in relation to each other and an inner sealing ring positioned at the inner surface of the sleeve for sealing the space between the inner surface of the pipe socket and the outer surface of a spigot end of a connecting pipe introduced into the socket, the pipe socket being characterized in that the outer sealing ring and the inner sealing ring are connected with each other.

In a preferred embodiment of the pipe socket according to the invention the sealing rings are chemically bound to the sleeve.

In accordance with the invention it is possible to provide a pipe socket by heating the end portion of the thermoplastic material pipe and moving the end portion over the sleeve while the end portion is expanded for providing the pipe socket which will then consist of the pipe end portion and said sleeve, the inner surface of the sleeve defining the inner surface of the pipe socket. Thereby the inferior shape permanence and dimensional stability of the thermoplastic material of the pipe end portion are of no importance as the surface which is of importance with regard to the tightness of the pipe joint, namely the inner surface of the socket, is defined by the sleeve which is of good shape permanence and dimensional stability.

In a preferred embodiment of the pipe socket according to the invention the outer surface of the sleeve has a section of a larger diameter and a section positioned adjacent the free end of the pipe socket of less diameter, an annular surface positioned between said sections and extending transversely of the axis of the sleeve, the outer sealing ring being constituted by a sealing lip having a base portion which is connected with and is preferably chemically bound to the sleeve at said annular surface and is positioned in a space defined by said annular surface and by the inner surface of the pipe end portion and the section of the outer surface of the sleeve having less diameter.

In the method of forming a pipe socket according to the invention a pipe end portion is moulded around a sleeve which after the moulding operation is left in the pipe end portion for defining the inner surface of the socket, wherein the sleeve is in advance of the moulding of the pipe end portion around the sleeve provided with an outersealing ring for sealing the pipe end portion and the sleeve in relation to each other and with an innersealing ring connected with said outer sealing ring for sealing the space between the inner surface of the pipe socket and the outer surface of a spigot end of a connecting pipe introduced into the socket.

It is preferred that the sealing rings are chemically bound to the sleeve.

The invention as described in the following with reference to the accompanying drawings.

Figure 1:
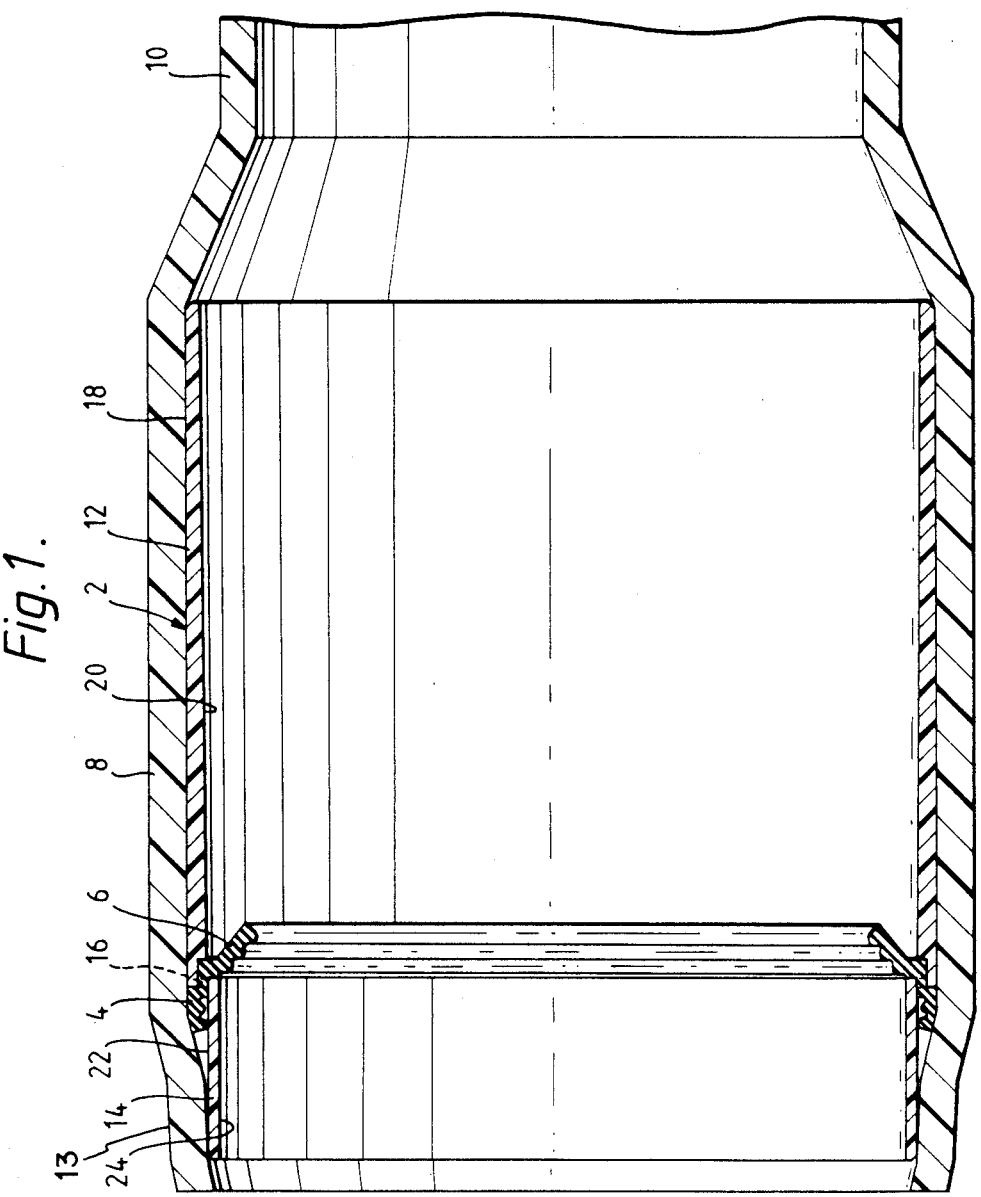
FIG. 1 is an axial section of a pipe socket according to the invention.

The pipe socket according to the invention shown in an axial section in FIG. 1 comprises a sleeve 2, an outer sealing ring 4 connected with the sleeve, an inner sealing ring 6 also connected with the sleeve and an expanded pipe end portion 8 of a pipe 10 of thermoplastic material, e.g. polyethylene, moulded around the sleeve 2.

The sleeve 2 has a portion 12 of larger diameter and a portion 14 of less diameter positioned at the free end 13 of the socket. Between the portions 12 and 14 the sleeve forms an annular wall portion 16 extending transversely of the axis of the sleeve and having a thickness of the same range as the wall thickness of the portions 12 and 14. Thus, the portion 12 of the sleeve forms a section 18 of the outer surface of the sleeve of larger outer diameter and a section 20 of the inner surface of the sleeve of larger inner diameter, while the portion 14 of the sleeve forms a section 22 of the outer surface of the sleeve of less outer diameter and a section 24 of the inner surface of the sleeve of less inner diameter. At the outer surface of the sleeve 2 the wall portion 16 of the sleeve forms an annular surface 26 facing the free end of the socket and forms at the inner side of the sleeve further annular surface 28 directed from the free end of the socket.

The outer sealing ring 4 is in the form of a sealing lip having a base portion 30 which is bound to the sleeve at the annular surface 26. In the completed pipe socket the sealing lip 4 is positioned within a space defined by the annular surface 26, the inner surface of the pipe end portion 8 and the surface section 22 of the sleeve 2 for sealing the sleeve 2 and the pipe end portion 8 in relation to each other.

Figure 5:
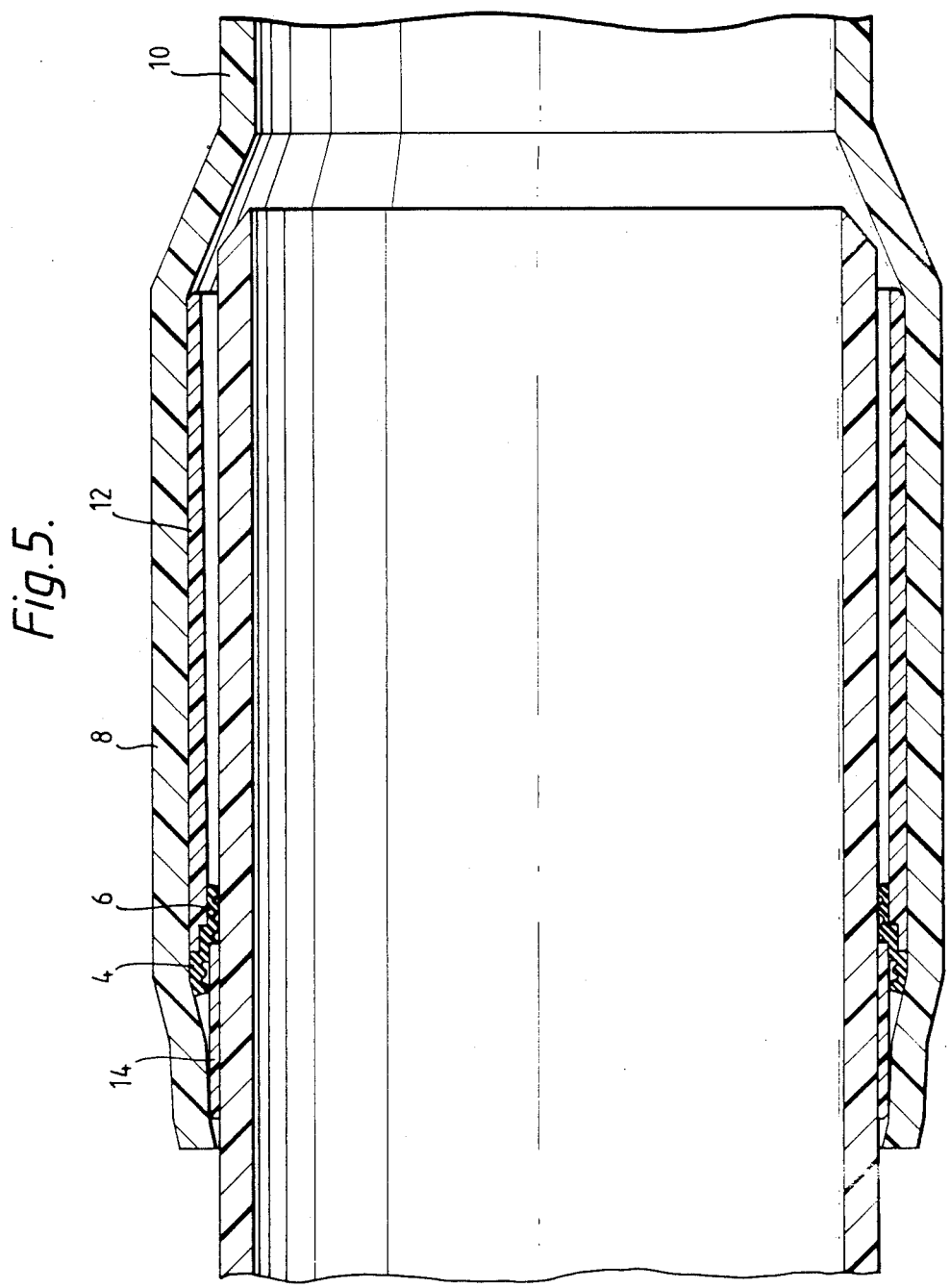
FIG. 5 is an axial section of a pipe joint formed by means of a pipe socket according to the invention.

Also the inner sealing ring 6 is in the form of a sealing lip having a base portion 30 which is bound to the annular surface 28. The sealing lip 6 is intended for sealing the pipe socket in relation to a spigot end introduced into the pipe socket as shown in FIG. 5.

Figure 3:
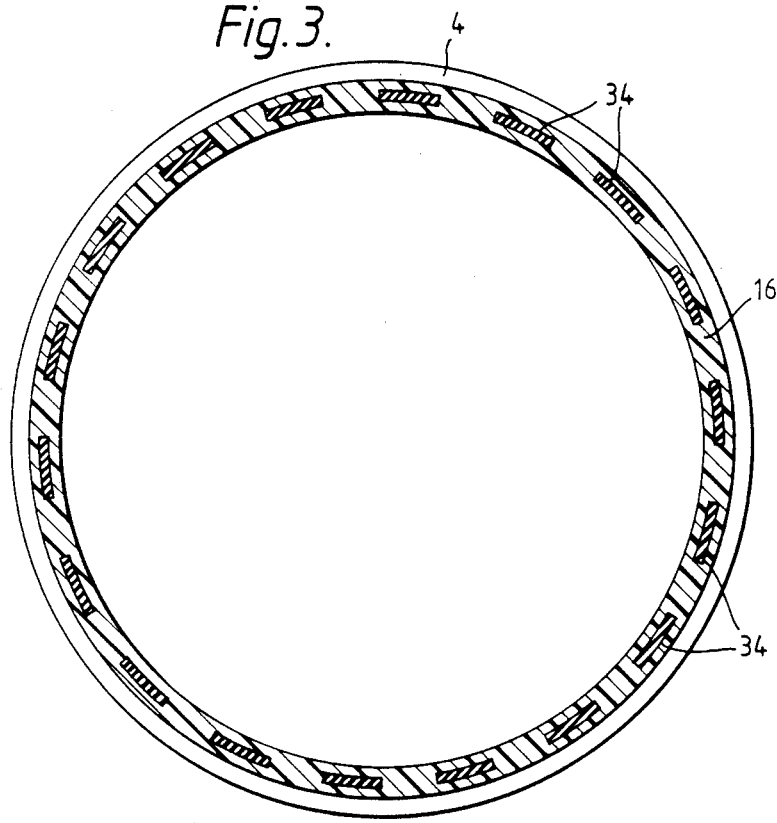
FIG. 3 is a cross section on line II—II of the sleeve shown in FIG. 2.
Figure 4:
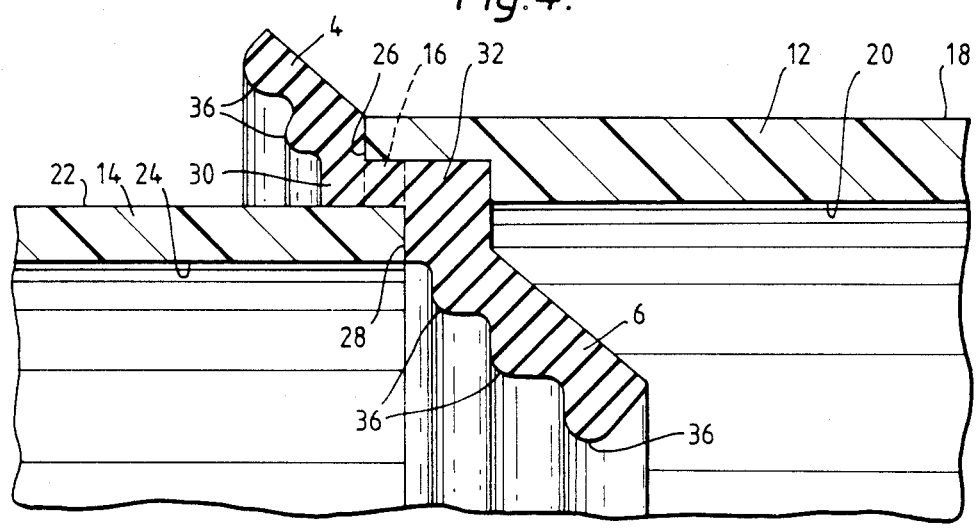
FIG. 4 is a detail of the sleeve according to FIG. 2 on an enlarged scale.

The base portions 30 and 32 of the sealing lips 4 and 6 are connected with each other through slot shaped openings 34 extending through the wall portion 16 as most clearly shown in FIG. 3. This provides in addition to the chemical binding of the sealing lips to the sleeve also a mechanical binding thereof to the sleeve.

At the surfaces of the sealing lips 4 and 6 intended to engage the surface section 22 and the outer surface of the spigot end introduced into the socket there are provided continuous ridges 36 in order to improve the sealing effect.

Figure 2:
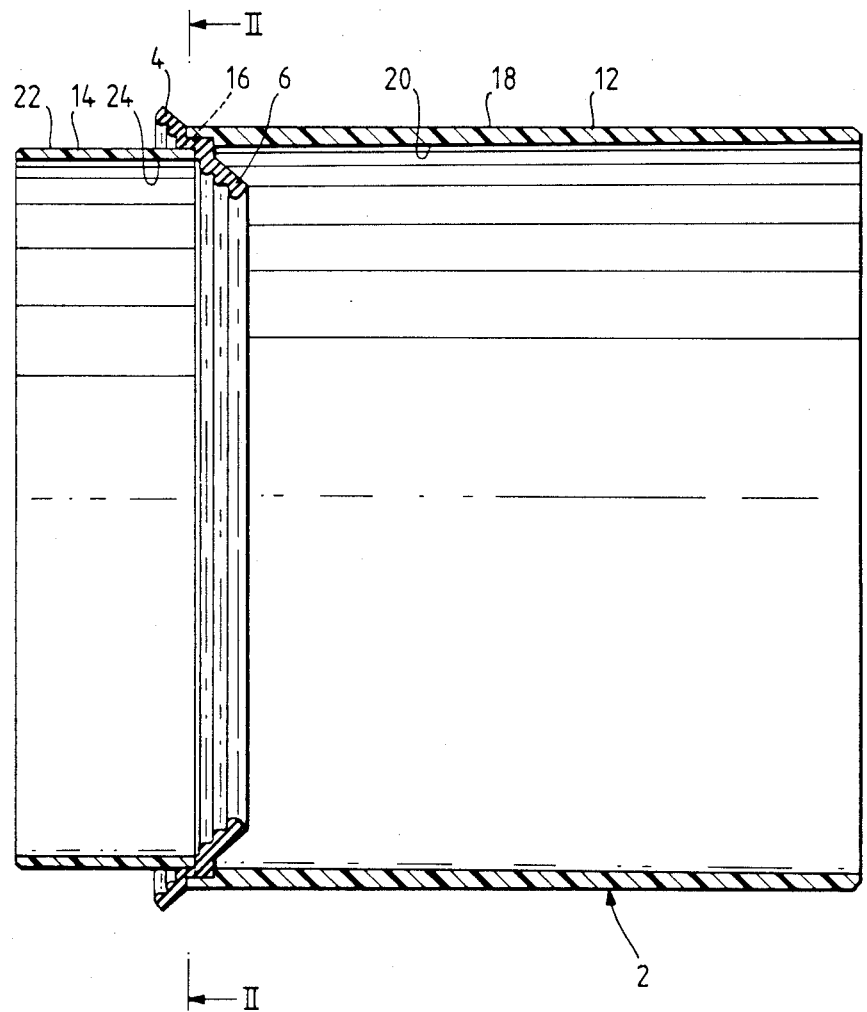
FIG. 2 is an axial section of a sleeve included in a pipe socket according to the invention.

As appears from FIG. 2 the sealing lips 4 and 6 extend from their base portions 30 and 32, respectively, obliquely outwards from the surface sections 22 and 20, respectively, of the sleeve in such a way that the sealing lips form in their relaxed condition an angle of about 40° with these surface sections.

As appears from FIG. 1 the pipe end portion 8 closely connects with the outer surface of the sleeve 2 in sealing relationship with the sealing lip 4. At its free end portion the pipe end portion 8 extends beyond the end surface of the portion 14 of the sleeve 2. The outer edge section of the pipe end portion 2 has somewhat reduced diameter so that the sleeve 2 is thereby axially fixed in the pipe end portion 8.

The sleeve 2 having the sealing lips 4 and 6 as shown in FIG. 2 is manufactured by positioning in a mould the plastic sleeve previously manufactured by injection moulding, the mould having cavities adjacent the sleeve for forming the sealing lips 4 and 6. Thus, the sealing lips 4 and 6 are moulded by injecting unvulcanized rubber into said mould cavities, the rubber material being of such a kind in relation to the plastic material forming the sleeve that there is provided a chemical binding between the rubber material and the plastic material. After the rubber material has vulcanized there has been provided a sleeve of the design shown in FIG. 2.

The pipe socket is thereupon formed by positioning the sleeve including the sealing lips 4 and 6 on a mandrel and by moving the heated, softened pipe end portion 8 in the axial direction over the mandrel and the sleeve positioned thereon. Thereby the pipe end portion 8 is expanded to the position shown in FIG. 1. After the pipe end portion 8 has been chilled and solidified and the socket thus formed has been separated from the mandrel with the sleeve retained in the pipe end portion in a locked-in position the pipe socket shown in FIG. 1 has been provided.

Because of the fact that the inner surface of the pipe socket is constituted by the sleeve 2 there has been provided a pipe socket having good shape permanence and dimensional stability and good tolerances in spite of the fact that the material of the pipe end portion per se has rather bad properties in these respects.

The pipe socket can be used for connecting the pipe 10 to another pipe by introducing the spigot end thereof into the pipe socket to the position shown in FIG. 5.

The invention can be modified within the scope of the following claims.

I claim:

1. A pipe socket comprising: a sleeve having an outer surface and an inner surface, and end portion of a pipe consisting of thermoplastic material molded around the sleeve, said pipe end portion having an inner surface, an outer sealing ring positioned between the inner surface of the pipe end portion and the outer surface of the sleeve, said outer sealing ring sealing the pipe end portion and the sleeve in relation to each other, and an inner sealing ring positioned at the inner surface of the sleeve adapted for sealing the space between the inner surface of the sleeve and the outer surface of a spigot end of a connecting pipe introduced into the socket; said pipe socket characterized in that: the outer sealing ring and the inner sealing ring are connected with each other, the outer surface of the sleeve has a section of larger diameter and a section positioned adjacent a free end of the pipe socket having smaller diameter, there being an annular surface of the sleeve extending between said sections of said sleeve in a direction transversely of the axis of the sleeve, and characterized further that the outer sealing ring is constituted by a sealing lip having a base portion which is connected with said annular surface of said sleeve and is positioned in a space defined by said annular surface and by the inner surface of the pipe end portion and an outer surface of the section of the outer surface of the sleeve having smaller outer diameter.

2. A pipe socket as claimed in claim 1, characterized in that the sealing rings are chemically bound to the sleeve.

3. A pipe socket as claimed in claim 1, characterized in that the sealing lip forms an angle of between 30° and 70°, preferably between 40° and 50°, which the section of the outer surface of the sleeve having less outer diameter, before the pipe end portion has been molded around the sleeve.

4. A pipe socket as claimed in claim 3, characterized in that the inner surface of the sleeve has a section of larger diameter and a section adjacent the free end of the pipe socket having a smaller inner diameter, between which section of said sleeve there extends a further annular surface of said sleeve positioned transversely of the axis of the sleeve and turned from the free end of the pipe socket, and the inner sealing ring is in the form of a further sealing lip having a base portion which is connected with the sleeve at said further annular surface thereof positioned at the inner surface of the sleeve, whereby when the spigot end is introduced into the socket the inner sealing ring is adapted to be positioned in a space defined by said further annular surface and by the outer surface of the spigot end and the section of the inner surface of the sleeve having a larger outer diameter.

5. A pipe socket as claimed in claim 4, characterized un that the annular surface at the outer surface of the sleeve is located at a small axial distance from the further annular surface at the inner surface of the sleeve so that the two annular surfaces define between themselves an annular wall portion having a thickness of the same dimension as the wall thickness of the rest of the sleeve and that said annular wall portion is penetrated by openings through which the outer sealing ring is connected with the inner sealing ring.

6. A pipe socket as claimed in claim characterized in that an edge of the pipe end portion extends beyond the edge of the adjacent end of the sleeve at a free end of the socket and that the inner surface of the edge of the pipe end portion is of smaller diameter than the outer surface of the adjacent edge portion of the sleeve.

7. A pipe socket as claimed in claim 1, characterized in that the inner surface of the sleeve has a section of larger diameter and a section adjacent the free end of the pipe socket having smaller inner diameter, between which sections of said sleeve there extends a further annular surface of the sleeve positioned transversely of the axis of the sleeve and turned from the free end of the pipe socket, and the inner sealing ring is in the form of a further sealing lip having a base portion which is connected with the sleeve at said further annular surface thereof positioned at the inner surface of the sleeve, whereby when the spigot end is introduced into the socket the inner sealing ring is adapted to be positioned in a space defined by said further annular surface and by the outer surface of the spigot end and an inner surface of the section of the inner surface of the sleeve having a larger outer diameter.

8. A pipe socket as claimed in claim 7, characterized in that the annular surface at the outer surface of the sleeve is located at a small axial distance from the further annular surface at the inner surface of the sleeve so that the two annular surfaces define between themselves an annular wall portion having a thickness of the same dimension as the wall thickness of the rest of the sleeve and that said annular wall portion is penetrated by openings through which the outer sealing ring is connected with the inner sealing ring.

9. A pipe socket as claimed in claim 8 characterized in that an edge of the pipe end portion extends beyond the edge of the adjacent end of the sleeve at a free end of the socket and that the inner surface of the edge of the pipe end portion is of smaller diameter than the outer surface of the adjacent edge portion of the sleeve.

10. A pipe socket as claimed in claim 7 characterized in that an edge of the pipe end portion extends beyond the edge of the adjacent end of the sleeve at a free end of the socket and that the inner surface of the edge of the pipe end portion is of smaller diameter than the outer surface of the adjacent edge portion of the sleeve.

11. A pipe socket as claimed in claim 1, characterized in that an edge of the pipe end portion extends beyond the edge of the adjacent end of the sleeve at a free end of the socket and that the inner surface of the edge of the pipe end portion is of smaller diameter than the outer surface of the adjacent edge portion of the sleeve.

12. A pipe socket as claimed in claim 1, characterized in that an edge of the pipe end portion extends beyond the edge of the adjacent end of the sleeve at a free end of the socket and that the inner surface of the edge of the pipe end portion is of smaller diameter than the outer surface of the adjacent edge portion of the sleeve.

13. A pipe socket comprising: a sleeve having an outer surface and an inner surface, an end portion of a pipe consisting of thermoplastic material molded around the sleeve, said pipe end portion having an inner surface, an outer sealing ring positioned between the inner surface of the pipe end portion and the outer surface of the sleeve, said outer sealing ring sealing the pipe end portion and the sleeve in relation to each other, and an inner sealing ring positioned at the inner surface of the sleeve adapted for sealing the space between the inner surface of the sleeve and the outer surface of a spigot end of a connecting pipe introduced into the socket; said pipe socket characterized in that: the outer sealing ring and the inner sealing ring are connected with each other, the sealing rings are chemically bound to said sleeve, the outer surface of the sleeve has a section of larger diameter and a section positioned adjacent a free end of the pipe socket having smaller diameter, there being an annular surface of said sleeve extending between said sections of said sleeve in a direction transversely of the axis of the sleeve, and characterized further in that the outer sealing ring is constituted by a sealing lip having a base portion which is connected with the sleeve at said annular surface of said sleeve and is positioned in a space defined by said annular surface and by the inner surface of the pipe end portion and an outer surface of the section of the outer surface of the sleeve having smaller outer diameter.

14. A pipe socket as claimed in claim 13, characterized in that the sealing lip forms an angle of between 30° and 70°, preferably between 40° and 50°, with the section of the outer surface of the sleeve having less outer diameter, before the pipe end portion has been molded around the sleeve.

15. A pipe socket as claimed in claim 14, characterized in that the inner surface of the sleeve has a section of larger diameter and a section adjacent a free end of the pipe socket having smaller inner diameter, between which sections of said sleeve there extends a further annular surface of said sleeve positioned transversely of the axis of the sleeve and turned from the free end of the pipe socket, and the inner sealing ring is in the form of a further sealing lip having a base portion which is connected with the sleeve at said further annular surface thereof positioned at the inner surface of the sleeve, whereby when the spigot end is introduced into the socket the inner sealing ring is adapted to be positioned in a space defined by said further annular surface and by the outer surface of the spigot end and an inner surface of the section of the inner surface of the sleeve having a larger outer diameter.

16. A pipe socket as claimed in claim 13, characterized in that the inner surface of the sleeve has a section of larger diameter and a section adjacent a free end of the pipe socket having smaller inner diameter, between which section of said sleeve there extends a further annular surface of said sleeve positioned transversely of the axis of the sleeve and turned from the free end of the pipe socket, and the inner sealing ring is in the form of a sealing lip having a base portion which is connected with the sleeve at said further annular surface thereof positioned at the inner surface of the sleeve, whereby when a spigot end is introduced into the socket the inner sealing ring is adapted to be positioned in a space defined by said further annular surface and by the outer surface of the spigot end and an inner surface of the section of the inner surface of the sleeve having a larger outer diameter.

17. A pipe socket comprising: a sleeve having an outer surface and an inner surface, an end portion of an elongate pipe consisting of thermoplastic material molded around the sleeve, said pipe end portion having an inner surface, an outer sealing ring positioned between the inner surface of the pipe end portion and the outer surface of the sleeve, said outer sealing ring sealing the pipe end portion and the sleeve in relation to each other, and an inner sealing ring positioned at the inner surface of the sleeve adapted for sealing the space between the inner surface of the sleeve and the outer surface of a spigot end of a connecting pipe adapted to be introduced into the socket; said pipe socket characterized in that: the outer sealing ring and the inner sealing ring are connected with each other by a base portion that extends through a plurality of openings in said sleeve and characterized further in that an edge of the pipe end portion extends beyond the edge of the adjacent end of the sleeve at a free end of the socket and that the inner surface of the edge of the pipe end portion is of smaller diameter than the outer surface of the adjacent edge portion of the sleeve.

* * * * *

UNITED STATES PATENT AND TRADEMARK OFFICE
CERTIFICATE OF CORRECTION

PATENT NO. : 4,984,831
DATED : January 15, 1991
INVENTOR(S) : Christer Bengtsson It is certified that error appears in the above-identified patent and that said Letters Patent is hereby corrected as shown below:

Column 1, line 48, delete "polyethylehe" and substitute therefor --polyethylene--.

Claim 5, column 5, line 11, delete "un" and substitute therefor --in--.

Signed and Sealed this

Seventh Day of July, 1992

Attest:

DOUGLAS B. COMER

*Attesting Officer*    Acting Commissioner of Patents and Trademarks